3,058,811
METHOD FOR THE ENRICHMENT OF D₂O IN SOLUTIONS OF D₂O IN H₂O
Edward G. Shay, King of Prussia, Pa., assignor to The Atlantic Refining Company, Philadelphia, Pa., a corporation of Pennsylvania
No Drawing. Filed Apr. 25, 1960, Ser. No. 24,241
7 Claims. (Cl. 23—204)

This invention relates to a method for enriching the concentration of $D_2O$ in solutions of $D_2O$ in $H_2O$ and more particularly this invention relates to a method for enriching the concentration of $D_2O$ in solutions of $D_2O$ in $H_2O$ by the use of non-ionic surface active agents having a polyalkylene glycol hydrophilic group in the molecule.

Deuterium oxide, $D_2O$, is particularly useful as a moderator in nuclear reactors. Consequently, numerous methods have ben proposed for enriching the concentration of $D_2O$ in solutions of $D_2O$ in $H_2O$. A large number of these proposed methods utilize various chemical compounds in so-called exchange processes. In many of these processes the separation factor is exceedingly low whereas in others the chemical compound employed is toxic or corrosive. Other proposed methods are exceedingly complex to operate. The instant process has the advantage of utilizing non-toxic and non-corrosive chemicals and, in addition, has useful separation factors and is simple to operate.

It is an object of this invention to provide a method for enriching the concentration of $D_2O$ in solutions of $D_2O$ in $H_2O$.

It is another object of this invention to provide a method for enriching the concentration of $D_2O$ in solutions of $D_2O$ in $H_2O$ by the use of non-ionic surface active agents having a polyalkylene glycol hydrophilic group in the molecule.

It is another object of this invention to provide a method for enriching the concentration of $D_2O$ in solutions of $D_2O$ in $H_2O$ by the use of non-ionic surface active agents having a polyalkylene glycol hydrophilic group in the molecule and liquid phase separation techniques.

Additional objects of this invention will be apparent from the detailed description of the invention that follows and from the claims.

In accordance with the invention a non-ionic surface active agent having a polyalkylene glycol hydrophilic group in the molecule is added to a solution of $D_2O$ in $H_2O$ at a temperature below the cloud point of the non-ionic surface active agent in the solution of $D_2O$ in $H_2O$, and thereafter the temperature of the solution of non-ionic surface active agent in the $D_2O$ in $H_2O$ solution is raised above the cloud point, thereby forming two liquid phases. The lower phase comprises a concentrated solution of the non-ionic surface active agent in a $D_2O$ in $H_2O$ solution wherein the concentration of $D_2O$ has been lowered and the upper phase comprises a dilute solution of the non-ionic surface active agent in a $D_2O$ in $H_2O$ solution wherein the concentration of the $D_2O$ has been enriched beyond the original concentration of $D_2O$ in the $H_2O$. Finally the liquid phases are separated to recover the enriched solution of $D_2O$ in $H_2O$.

The $D_2O$ in $H_2O$ solutions which may be utilized in this invention include solutions in which the concentration of $D_2O$ ranges from that found in natural waters to 99 weight percent or more. The method of this invention is particularly useful, however, when applied to solutions having $D_2O$ concentrations in $H_2O$ within the preferred range of from 5 weight percent to 95 weight percent.

The non-ionic surface active agents which are suitable for use in this invention are those having a polyalkylene glycol hydrophilic group in the molecule. Examples of such non-ionic compounds are the alkyl aryl polyalkoxy alcohols, polyglycol esters, ethylene oxide condensation products, propylene glycol esters, polyoxyethylene ether alcohols, polyethylene glycol fatty esters and the like. A particularly preferred group of surface active agents are the isooctyl phenol polyethoxy ethanols, e.g. the adducts of ethylene oxide with isooctyl phenol. These non-ionic surface active agents are solubilized by the hydration of the polyalkoxy chain, that is, hydrogen bonding between the water molecules and the ether oxygen atoms in the alkoxy chain of the molecule of surface active agent. In addition, these non-ionic surface active agents have negative solubility coefficients, that is, in aqueous solutions these compounds become less soluble at higher temperatures. At a certain characteristic temperature non-ionics of this type begin to separate slightly from solution giving a turbid solution. The temperature at which this turbidity appears is called the cloud point of the solution. The temperature at which the cloud point occurs is dependent upon the hydrophilic-hydrophobic balance of the surface active agent molecule. If the molecule has a fairly short alkoxy chain compared to the hydrophobic portion of the molecule, the non-ionic may form cloudy solutions at room temperatures, whereas if the solubilizing chain is sufficiently long the cloud point may be observed at much higher temperatures up to the boiling point of the water solution and in some instances, with exceedingly long chains no cloud point will be obtained even on boiling.

The compounds particularly suitable for use in this invention are the non-ionic surface active agents having a polyalkylene glycol hydrophilic group in the molecule of a length such that the cloud point of the agent in the $D_2O$ in $H_2O$ solution ranges between 32° F. and 212° F. at atmospheric pressure. If superatmospheric pressures are utilized so that the $D_2O$ in $H_2O$ solution is maintained in the liquid phase it is possible to use non-ionic agents having longer hydrophilic chains such that their cloud points are above 212° F. provided they are within the temperature range wherein the $D_2O$ in $H_2O$ solution is maintained in the liquid phase by the superatmospheric pressure. Working at superatmospheric pressures, however, requires more complex and expensive equipment, hence it is preferred to use agents having cloud points in the 32° F. to 212° F. range. When a sufficiently concentrated solution of such a non-ionic surface active agent is heated at or above the cloud point, phase separation will occur. The upper layer contains a more dilute solution of the surface active agent as compared with the original solution, while the lower layer contains a concentrated solution of the surface active agent. Thus, for example, a two percent solution of such a non-ionic surface active agent when heated above its cloud point will produce a lower cloudy layer containing 30 percent or more of the agent. This separation is believed to be caused by the thermal breaking of the hydrogen bonds between the water molecule and the oxygen atoms in the alkoxy chain of the surface active agent molecule.

It has also been found that these non-ionic surface active agents give similar cloud points in $D_2O$. In this instance it is deuterium bonding between the deuterium oxide molecules and the oxygen atoms of the alkoxy chain that are broken. In all cases, the cloud points in deuterium oxide are lower than in ordinary water when the same non-ionic surface active agent is compared in both liquids. Mixtures of $D_2O$—$H_2O$ give intermediate cloud points as compared with the cloud point in $H_2O$ and in $D_2O$.

It has been found in accordance with this invention that when a non-ionic surface active agent having a polyalkylene glycol hydrophilic group in the molecule of the type described is added to $D_2O$—$H_2O$ solutions at a temperature below the cloud point of the non-ionic agent in such solution and thereafter, if the solution of the non-ionic agent is heated to a temperature above its cloud point in the $D_2O$—$H_2O$ solution, the lower phase will contain the non-ionic agent in the form of a concentrated solution, whereas the upper phase will contain a dilute solution of the non-ionic agent. The concentration of the $D_2O$ in the $H_2O$, however, is higher in the upper phase than the concentration of the $D_2O$ in the original solution and, in addition, it is higher than the concentration in the lower phase. Accordingly, when the phases are separated by a simple conventional means, such as decantation, there is obtained an enriched $D_2O$ solution in $H_2O$.

It is preferred to utilize quantities of non-ionic surface active agent such that the concentration of the agent in the $D_2O$—$H_2O$ solution at a temperature below the cloud point of such agent in the solution ranges from 0.5 weight percent to 20.0 weight percent and, most preferably, between 1.0 weight percent and 15.0 weight percent. Solutions having concentrations outside of these ranges may be used but are not preferred since extremely dilute solutions are ineffective, whereas with highly concentrated solutions there may be interference with the separation obtainable because of the large quantity of non-ionic agent present.

It has been observed that as the quantity of surface active agent is increased, the lower layer becomes larger and as the time the solution is held above the cloud point is increased the lower layer becomes larger because of more complete precipitation. In general, at preferred conditions the upper layer will range between 70 percent and 95 percent by volume and the lower between 30 percent and 5 percent by volume based on the sum of the volumes of the two phases. The lower layer is characteristically cloudy and slightly more viscous than the upper layer at the cloud point temperature or above and, accordingly, there is a sharp interface between the two layers which makes possible relatively clean separations by simple decantation methods.

It is preferred to hold the solution at or above the cloud point for about one hour to obtain clean phase separations although times as short as five minutes have proved to be sufficient in some instances. In general, the time required for phase separation is easily determined by visual observation.

The following examples are illustrative of various features and specific embodiments of the invention, however, they should not be construed as limiting the invention to the specific conditions and compounds employed therein.

EXAMPLE I

The cloud points of a series of non-ionic surface active agents having a polyalkylene glycol hydrophilic group in the molecule were determined both in $D_2O$ and $H_2O$. These surface active agents all had the same hydrophobic base, i.e. isooctyl phenol, but had ethoxy chains of varying lengths obtained by reacting the isooctyl phenol with various mole ratios of ethylene oxide to give a series of isooctyl phenyl polyethoxy ethanols. The deuterium oxide used contained 99.5+ weight percent $D_2O$ and the water employed was ordinary laboratory distilled water. In each determination the quantity of non-ionic agent employed was 1.0 weight percent based on the weight of the solution. The cloud points are set forth in Table I.

Table I

| Liquid | No. of (—$C_2H_4O$—) units in the polyethoxy chain of the isooctyl phenyl polyethoxy ethanol | Cloud Point, ° F. (Atmospheric Pressure) |
|---|---|---|
| $D_2O$ | 7 | ~73 |
| $H_2O$ | 7 | ~83 |
| $D_2O$ | 9–10 | 142 |
| 50 wt. percent $D_2O$ 50 wt. percent $H_2O$ | 9–10 | 147 |
| $H_2O$ | 9–10 | 151 |
| $D_2O$ | 12–13 | 187 |
| $H_2O$ | 12–13 | 195 |
| $D_2O$ | 16 | 205 |
| $H_2O$ | 16 | [1] 212 |
| $D_2O$ | 20 | [1] 212 |

[1] Soluble at 212° F., no cloud point observed.

These data show that the cloud point temperatures for a series of non-ionic surface active agents increases with increasing hydrophilic chain length, that the cloud point for a particular agent is lower in $D_2O$ than in $H_2O$ and that the cloud point for the same agent in a $D_2O$ in $H_2O$ solution is intermediate its cloud points in $D_2O$ and in $H_2O$. These data also show that it is possible to have such a long hydrophilic chain that the agent does not have a cloud point below the boiling point. It is also apparent from these data that isooctyl phenyl polyethoxy ethanols having from 7 to 16 ethoxy (—$C_2H_4O$—) groups in the molecule have cloud points between 32° F. and 212° F. in $D_2O$ in $H_2O$ solutions.

EXAMPLE II

A solution consisting of 10 weight percent $D_2O$ and 90 weight percent $H_2O$ was prepared. A sufficient quantity of isooctyl phenyl polyethoxy ethanol having from 9 to 10 ethoxy groups in the molecule was added to this $D_2O$ in $H_2O$ solution to give a 1.0 weight percent concentration of the ethanol in the $D_2O$ in $H_2O$ solution at room temperature. The mixture was slowly heated to 160° F. in a water bath and the layers thus formed were separated by decantation from a separatory funnel. Infrared analysis showed that the upper layer contained 10.5 weight percent $D_2O$ and the lower layer 6.6 weight percent $D_2O$ thus demonstrating that the upper layer was enriched in $D_2O$.

EXAMPLE III

A solution consisting of 45 grams of $D_2O$ and 55 grams of $H_2O$ was prepared. A 1.25 gram portion of the same isooctyl phenyl polyethoxy ethanol employed in Example II was added to the $D_2O$ in $H_2O$ at room temperature. The solution was heated to 150° F. and the upper layer separated from the lower layer. The weight percent concentration of $D_2O$ in the upper layer was found to be 3.8 percent greater than the concentration of $D_2O$ in the lower layer. A 1 gram portion of the same ethanol was added to the cooled upper layer and the solution again heated to 150° F. and the phases separated. This was repeated three additional times and after the final separation the upper layer had a $D_2O$ concentration of 5.5 weight percent more than the $D_2O$ concentration of the lower layer.

EXAMPLE IV

A solution consisting of approximately 8 weight percent $D_2O$ in $H_2O$ was prepared. A sufficient quantity of the same non-ionic surface active agent as was employed in Examples II and III was added to one portion of the $D_2O$ in $H_2O$ solution to give a solution of about 10 weight percent concentration of the non-ionic. A second non-ionic surface active agent sold under the trade name "Pluronic L44," a condensate of ethylene oxide with a base formed by condensing propylene oxide with propylene glycol, which agent has a molecular weight of about 2200, was also added to another portion of the $D_2O$ in $H_2O$ solution in an amount sufficient to give a solution of about 10 weight percent concentration of the non-ionic. Each of the solutions was heated to about 175° F. and held at that temperature for one hour. The phases were separated and in both instances the concentration of the $D_2O$ in $H_2O$ in the upper layer was enriched.

I claim:
1. A method for enriching the concentration of $D_2O$ in solutions of $D_2O$ in $H_2O$ which comprises introducing into said solution of $D_2O$ in $H_2O$ a non-ionic surface active agent having a polyalkylene glycol hydrophilic group in the molecule at a temperature below the cloud point of said surface active agent in said $D_2O$ in $H_2O$ solution, raising the temperature of the solution of said surface active agent in said $D_2O$ in $H_2O$ solution above the cloud point thereby forming two liquid phases, the lower phase comprising a concentrated solution of said non-ionic surface active agent, the upper phase comprising a solution of $D_2O$ in $H_2O$ having an enriched concentration of $D_2O$, separating the phases and recovering the aqueous phase having an enriched concentration of $D_2O$.

2. A method for enriching the concentration of $D_2O$ in solutions of $D_2O$ in $H_2O$ which comprises introducing into said solution of $D_2O$ in $H_2O$ a non-ionic surface active agent having a polyalkylene glycol hydrophilic group in the molecule at a temperature below the cloud point of said surface active agent in said $D_2O$ in $H_2O$ solution, said surface active agent having a cloud point in said $D_2O$ in $H_2O$ solution at a temperature between 32° F. and 212° F. at atmospheric pressure, raising the temperature of the solution of said surface active agent in said $D_2O$ in $H_2O$ solution above the cloud point thereby forming two liquid phases, the lower phase comprising a concentrated solution of said non-ionic surface active agent, the upper phase comprising a solution of $D_2O$ in $H_2O$ having an enriched concentration of $D_2O$, separating the phases and recovering the aqueous phase having an enriched concentration of $D_2O$.

3. A method for enriching the concentration of $D_2O$ in solutions of $D_2O$ in $H_2O$ which comprises introducing into said solution of $D_2O$ in $H_2O$ from 0.5 weight percent to 20.0 weight percent of a non-ionic surface active agent having a polyalkylene glycol hydrophilic group in the molecule at a temperature below the cloud point of said surface active agent in said $D_2O$ in $H_2O$ solution, said surface active agent having a cloud point in said $D_2O$ in $H_2O$ solution at a temperature between 32° F. and 212° F. at atmospheric pressure, raising the temperature of the solution of said surface active agent in said $D_2O$ in $H_2O$ solution above the cloud point thereby forming two liquid phases, the lower phase comprising a concentrated solution of the non-ionic surface active agent, the upper phase comprising a solution of $D_2O$ in $H_2O$ having an enriched concentration of $D_2O$, separating the phases and recovering the aqueous phase having an enriched concentration of $D_2O$.

4. A method for enriching the concentration of $D_2O$ in solutions of $D_2O$ in $H_2O$ which comprises introducing into said solution of $D_2O$ in $H_2O$ from 1.0 weight percent to 15.0 weight percent of a non-ionic surface active agent having a polyalkylene glycol hydrophilic group in the molecule at a temperature below the cloud point of said surface active agent in said $D_2O$ in $H_2O$ solution, said surface active agent having a cloud point in said $D_2O$ in $H_2O$ solution at a temperature between 32° F. and 212° F. at atmospheric pressure, raising the temperature of the solution of said surface active agent in said $D_2O$ in $H_2O$ solution above the cloud point thereby forming two liquid phases, the lower phase comprising a concentrated solution of the non-ionic surface active agent, the upper phase comprising a solution of $D_2O$ in $H_2O$ having an enriched concentration of $D_2O$, separating the phases and recovering the aqueous phase having an enriched concentration of $D_2O$.

5. A method for enriching the concentration of $D_2O$ in solutions of $D_2O$ in $H_2O$ which comprises introducing into said solution of $D_2O$ in $H_2O$ an alkyl aryl polyalkoxy alcohol at a temperature below the cloud point of said alcohol in said $D_2O$ in $H_2O$ solution, raising the temperature of the solution of said alcohol in said $D_2O$ in $H_2O$ solution above the cloud point thereby forming two liquid phases, the lower phase comprising a concentrated solution of said alcohol, the upper phase comprising a solution of $D_2O$ in $H_2O$ having an enriched concentration of $D_2O$, separating the phases and recovering the aqueous phase having an enriched concentration of $D_2O$.

6. A method for enriching the concentration of $D_2O$ in solutions of $D_2O$ in $H_2O$ which comprises introducing into said solution of $D_2O$ in $H_2O$ an isooctyl phenyl polyethoxy ethanol having from 7 to 16 ethoxy units in the polyethoxy chain at a temperature below the cloud point of said ethanol in said $D_2O$ in $H_2O$ solution, raising the temperature of the solution of said ethanol in said $D_2O$ in $H_2O$ solution above the cloud point thereby forming two liquid phases, the lower phase comprising a concentrated solution of said ethanol, the upper phase comprising a solution of $D_2O$ in $H_2O$ having an enriched concentration of $D_2O$, separating the phases and recovering the aqueous phase having an enriched concentration of $D_2O$.

7. A method for enriching the concentration of $D_2O$ in solutions of $D_2O$ in $H_2O$ which comprises introducing into said solution of $D_2O$ in $H_2O$ an isooctyl phenyl polyethoxy ethanol having from 9 to 10 ethoxy units in the polyethoxy chain at a temperature below the cloud point of said ethanol in said $D_2O$ in $H_2O$ solution, raising the temperature of the solution of said ethanol in said $D_2O$ in $H_2O$ solution above the cloud point thereby forming two liquid phases, the lower phase comprising a concentrated solution of said ethanol, the upper phase comprising a solution of $D_2O$ in $H_2O$ having an enriched concentration of $D_2O$, separating the phases and recovering the aqueous phase having an enriched concentration of $D_2O$.

References Cited in the file of this patent

"Chem. and Eng. News," pages 477–480, Jan. 30, 1956.

UNITED STATES PATENT OFFICE
CERTIFICATE OF CORRECTION

Patent No. 3,058,811                        October 16, 1962

Edward G. Shay

It is hereby certified that error appears in the above numbered patent requiring correction and that the said Letters Patent should read as corrected below.

Column 1, line 18, for "unclear" read -- nuclear --; line 19, for "ben" read -- been --; column 2, line 3, for "filycol" read -- glycol --.

Signed and sealed this 5th day of March 1963.

(SEAL)
Attest:

ESTON G. JOHNSON
Attesting Officer

DAVID L. LADD
Commissioner of Patents